United States Patent [19]

Vogeley, Jr.

[11] Patent Number: 5,585,603

[45] Date of Patent: Dec. 17, 1996

[54] METHOD AND SYSTEM FOR WEIGHING OBJECTS USING X-RAYS

[75] Inventor: Arthur W. Vogeley, Jr., Bellevue, Wash.

[73] Assignee: Design Systems, Inc., Redmond, Wash.

[21] Appl. No.: 172,406

[22] Filed: Dec. 23, 1993

[51] Int. Cl.$^6$ ............................ G01G 19/22; G01G 3/14; G01B 15/02
[52] U.S. Cl. ........................ 177/25.13; 177/1; 177/210 R; 364/567; 378/54
[58] Field of Search ................................. 378/54; 177/1, 177/210 R, 25.13; 364/466, 567

[56] References Cited

U.S. PATENT DOCUMENTS

| | | | |
|---|---|---|---|
| 4,720,808 | 1/1988 | Repsch | 364/568 |
| 4,879,752 | 11/1989 | Anne et al. | 378/54 X |
| 4,899,298 | 2/1990 | Overhoff | 378/54 X |
| 5,150,394 | 9/1992 | Karellas | 378/54 X |
| 5,177,776 | 1/1993 | Ohmori et al. | 378/54 X |
| 5,331,163 | 7/1994 | Leahey et al. | 378/54 X |

FOREIGN PATENT DOCUMENTS 89-12281  12/1989  WIPO ..................................... 378/54

OTHER PUBLICATIONS

"Video-Imaging Fluid Cutting System," Oct., 1993, Meat & Poultry, p. 91.
"X-Ray Process Monitoring Seminar," EG&G Corp.

*Primary Examiner*—Brian W. Brown
*Assistant Examiner*—Randy W. Gibson
*Attorney, Agent, or Firm*—Christensen O'Connor Johnson & Kindness PLLC

[57] ABSTRACT

A method and system for weighing an object as it is carried on a conveyor past an x-ray source. X-rays from the x-ray source pass through the object, are attenuated in proportion to the mass of the object through which they pass, and impinge upon an x-ray detector array. X-ray detector array includes a layer of scintillating material that produces light in response to the intensity of the x-rays and a plurality of photodiodes to detect the light. The intensity of the x-rays received at the x-ray detector array is indicated by signals produced by the photodiodes, which are periodically scanned by a processor. The photodiode signals are each converted to a value representing the average areal density for a volume element extending above the photodiode into the object. Using the average areal density for each volume element and the size of each volume element, the processor determines the mass of the volume element. The entire object is advanced, and the mass of the volume elements in the object are generated and stored. The total mass of an object is determined by summing the masses of the volume elements, and a mass map of an object is generated that represents the location and mass of all of the volume elements in the object.

30 Claims, 4 Drawing Sheets

METHOD AND SYSTEM FOR WEIGHING OBJECTS USING X-RAYS

FIELD OF THE INVENTION

This invention relates generally to automated systems for processing materials, and more specifically, to a method and system for weighing objects that are carried on a conveyor.

BACKGROUND OF THE INVENTION

The processing of meat, poultry, fish, and other food products has traditionally been a labor-intensive endeavor. In an effort to streamline operations while increasing output, many food processors have turned to automated systems for cutting and packaging their products. These systems, ranging from the simple to the very complex, have gained widespread acceptance in the industry and have started to rival their human counterparts in accuracy, while exceeding them in speed.

One of the automated systems developed for food processors was a system for generating a mapping of the mass of a product. Knowing how the mass was distributed in a product allowed a processor to cut the product into portions of specified weight. To determine the mass map of a product, an indirect estimate of the mass was usually made based on the volume of the product. In a typical method, a curtain of light was directed towards the top surface of a product as it was carried on a conveyor belt. The curtain of light appeared as a bright stripe of light on the material. Video cameras would monitor the deflection of the light stripe, and a computer would process the information from the video cameras to determine the height of the product above the conveyor belt. The system would store the height measurements to form a profile map of the material as it was carried through the light curtain on the conveyor. Once a profile map was generated, a computer would divide the product into a series of volume elements that extended from the surface of the product down to the conveyor belt. The mass of each volume element was calculated by multiplying the volume of each element by a pre-set density of the material. Adding the mass values of all of the volume elements gave the total mass of the product.

While the light curtain method succeeded in approximating the mass of a product, the method suffered from several inherent problems. Most problematic was that variations in the density within the material, or the existence of air pockets under the material, resulted in inaccuracies in the mass measurement. Only if the product were of uniform density and flush with the surface of the conveyor would the mass be exact. Further, the use of a light curtain to determine the height of the product also produced problems as the light stripe was often hidden behind undulations in the surface of the material or indistinct due to the color of the material being weighed. What was required to resolve these problems was a system that would directly measure the mass of the product.

Some of the more recent automated food processing systems have started to use x-rays to directly inspect and image food products. X-rays are attenuated as they pass through matter in proportion to the total mass of the materials through which they pass. The intensity of an x-ray received at an x-ray detector after it has passed through an object is therefore inversely proportional to the density of the object. For example, x-rays passing through a chicken bone, which has a relatively higher density, will be more attenuated than x-rays that pass through the meat of the chicken, which has a relatively lower density. Manufacturers of food processing systems have realized that the characteristic attenuation of x-rays may be advantageously used to examine and inspect food products.

Prior an systems that use an x-ray source to inspect or image food products generally fall within two categories. At one end of the spectrum are very simple systems that use x-rays to detect food products that contain defects such as unwanted bones or foreign matter. In these simple systems, x-rays are directed through food products, such as poultry, beef, or fish, toward an x-ray detector. By appropriately processing the signal from the detector, a computer can determine if the food product passing over the detector contains an unwanted bone or other foreign object. Items that contain unwanted material are separated for further processing or for disposal. In this manner, products of an acceptable quality can be quickly and easily sorted from defective food products. At the other end of the spectrum are extremely complex automated butchering systems such as that described in U.S. Pat. No. 5,162,016 to Malloy. Malloy discloses a system wherein an entire carcass of an animal is 3-dimensionally imaged using x-rays and then automatically segmented into primals under computer control. A carcass is positioned on a mounting vehicle before entering an imaging station. At the imaging station, two television cameras examine the exterior of the carcass, and a pair of orthogonally-mounted x-ray scanners map the interior of the carcass. By scanning with high and low energy x-rays, the x-ray scanners can identify and produce a three-dimensional image of the carcass's meat, bones, and muscles. After the carcass has been fully scanned, the mounting vehicle moves the carcass to a cutting station. There, under computer control, high pressure water jets cut the carcass based upon the scanned internal and external configuration; the computer guiding the cutting jets around bone or fat. The pieces removed from the carcass are then carried away on a conveyor belt for further processing.

While the two systems discussed above are certainly beneficial to the food processing industry, their use is rather specialized. The simple system can detect defects within meat, but is only used to reject bad products. In contrast, Malloy's system can accurately detect the location and orientation of any defects or structures within the carcass, including bones, muscles, abscesses, or foreign objects. The information can then used to guide cutting devices to remove the meat from the unwanted material. Unfortunately, this complexity comes at a price. The system is large, expensive, and has relatively slow throughput, greatly limiting its application.

What neither of the systems suggest is a third use of x-rays that is significantly different than sorting or complex imaging of food products. Specifically, x-rays can be used as a quick and inexpensive method of weighing food products. This previously unrecognized use of x-rays will allow producers of food products to automatically and accurately determine the weight of products before labeling or portioning.

SUMMARY OF THE INVENTION

This invention is directed to a method and system for weighing food products as they are transported on a conveyor. The system comprises an x-ray source located above a conveyor belt, and a computer connected to (1) a position sensor on the conveyor belt and (2) a linear array of x-ray detectors located beneath the conveyor belt. The x-ray source is positioned so that food products located on the conveyor will be carried through a cone of x-rays generated by the x-ray source. As the x-rays from the x-ray source strike and pass through the food product, they are attenuated in proportion to the mass of the product through which the x-rays pass. After passing through the conveyor belt, the x-rays then fall upon the surface of the linear array of x-ray detectors. The computer scans each detector, and based on the intensity of the signal generated by each detector, the computer calculates a value of the average areal density (mass per unit of surface area) of the material through which the x-rays passed. For example, a low intensity x-ray at a detector indicates a high average areal density, while a high intensity x-ray at a detector indicates a low average areal density.

Using the average areal density, the computer determines a value for the mass of the "volume element" subtended by each detector. The mass of the volume element is proportional to the weight of a column of food product measured by each detector. To arrive at a mass value for each volume element, the average areal density is multiplied by the surface area effectively covered by each detector scan. The surface area scanned each time the detectors are read is approximated by multiplying the distance between detectors measured laterally across the conveyor width by the amount that the product has moved from the last scan of the detectors. The movement of the product is determined by the computer based on the signal from the position sensor attached to the conveyor.

The calculated mass of the volume element above each detector is used to generate two different mass profiles for each food product. First, the mass of all volume elements from a particular series of scans can be added to find the total weight of the portion of the product that has moved over the detector on the conveyor. Once the product passes the detector, the computer adds the value of all volume elements to calculate the total mass of the passing product.

The calculated mass of each volume element is also used to arrive at a "mass map" for the product. As the food product passes over the detector on the conveyor belt, the computer stores the position and mass of each volume element. As the position and mass of the volume elements are stored, a complete map or profile of the product passing on the conveyor is constructed. The mass map is then preferably later recalled for use in further processing of the food product. For example, high pressure water cutters directed by the computer based upon the mass map could partition the food product into portions of a desired size.

An advantage of the disclosed invention is that it provides a relatively simple and inexpensive method to determine the total mass and generate a mass map of a food product as it is transported on a conveyor. Only a single x-ray source is necessary, and the associated detector and sensor are relatively uncomplicated. Thus, relatively small processing operations can readily incorporate the invention into their food processing lines.

A further advantage of this invention is that it can be incorporated into an existing conveyor line relatively easily. Unlike a stand-alone system, this system can be set up on a conveyor line anywhere that a sensor can be attached to the conveyor to determine the position of a product on the conveyor. The physical size of the system is relatively small, and the computer for processing the data from the x-ray detector can be located separate from the conveyor line, greatly simplifying retrofitting the system into existing facilities.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
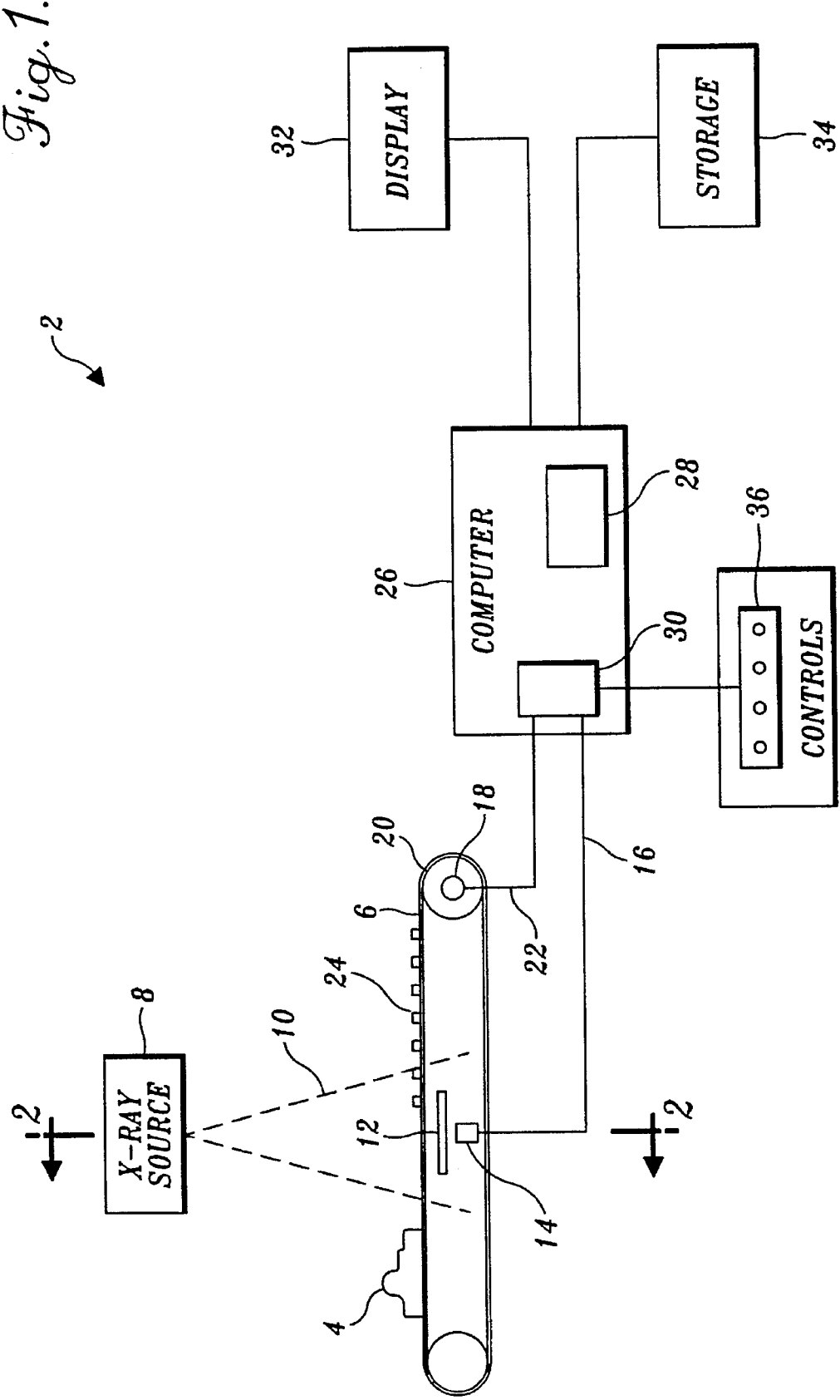
FIG. 1 is a block diagram of the disclosed system for weighing materials as they are transported on a conveyor.

A preferred embodiment of a weighing system 2 is disclosed in FIG. 1. A conveyor belt 6 carries a food product 4 to be weighed under an x-ray source 8 that is emitting a continuous stream of x-rays 10. Conveyor belt 6 is made of a material that is permeable to x-rays, such as rubber or plastic. Because of this construction, x-rays 10 easily pass through conveyor belt 6 to impinge upon an x-ray detector array 14 disposed below the conveyor, and centered within the path of x-rays 10.

Figure 2:
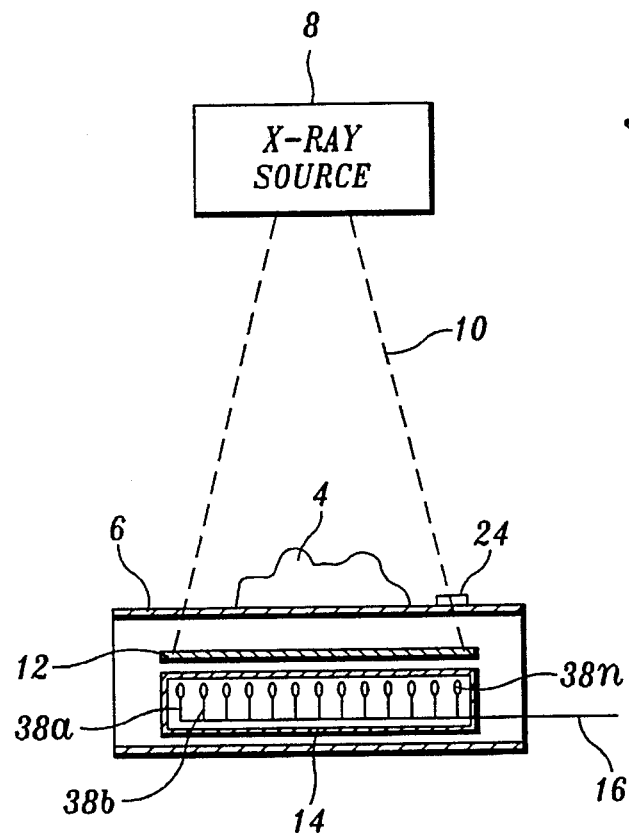
FIG. 2 is a cross-sectional diagram of the disclosed system as viewed along the conveyor belt.

The construction of the x-ray detector array can be more readily appreciated by reference to FIG. 2, which shows a cutaway view of the weighing system 2 as viewed along the conveyor. X-ray source 8 is located at a sufficient distance from the conveyor 6 so that x-rays 10 emitted from the source completely encompass the width of the conveyor. X-rays 10 pass through the food product, through conveyor 6, and impinge upon a layer of scintillating material 12. Positioned under this sheet of scintillating material is a line of photodiodes 38a, 38b, ... 38n. Since photodiodes 38 of x-ray detector array 14 only respond to visible light, scintillating material 12 is used to convert the x-ray energy into visible light flashes that are proportional to the strength of the incoming x-rays. X-rays that impinge upon scintillating material 12 are converted into visible light flashes to which photodiodes of x-ray detector array 14 respond. Photodiodes 38 generate electrical signals having an amplitude proportional to the intensity of light reaching them. These signals are conveyed on a bus 16.

Returning to FIG. 1, when the measuring system is operating, conveyor belt 6 advances food product 4 under x-ray source 8. As food product 4 is carried through x-rays 10, the x-rays pass through the food product and are attenuated in direct proportion to the mass of the material composing the food product through which the x-rays pass. When the x-rays impinge upon the surface of scintillating material 12, the intensity of light flashes generated will vary in inverse proportion to the attenuation of the x-rays. These light flashes are picked up by photodiodes 38 of x-ray detector array 14.

The position of the food product 4 is monitored by the computer at all times using a position sensor. Several different types of position sensors are suitable for monitoring the position of the product. For example, a rotary encoder 18 may be attached to a roller 20 of the conveyor. The rotary encoder would indirectly monitor the position of an object by tracking the relative movement of the conveyor, regardless of the speed at which the conveyor is operating. The signal from rotary encoder 18 could be transmitted to computer 26 over a line 22. Alternatively, markings 24 that are impervious to x-rays may be attached to, or constructed into, the conveyor belt at regularly spaced intervals. Markings 24 would prevent the x-rays from reaching detector array 14 when the markings passed between the x-ray source and the detector, but would allow x-rays through the conveyor when the markings were not in front of the x-ray source. The motion of the conveyor would therefore produce a series of x-ray pulses that are alternately received at the segment of detector array 14 located under markings 24. If the markings were placed along an edge of the conveyor so that they did not interfere with mass measurement of the object, the computer could determine the position and movement of the object by appropriately processing the signal from the detector array received on bus 16.

The flashes of light are converted to electrical signals by x-ray detector array 14 and are downloaded to a computer 26 via bus 16 and an interface circuit 30. Similarly, the signal from the position sensor is also connected to computer 26 through the interface circuit. Interface circuit 30 converts the signals from analog to digital values for manipulation in the computer. Using the signals from x-ray detector array 14 and also from the position sensor, the computer determines the mass of each volume element of product 4 as it passes under x-ray source 8 on conveyor 6. The method for arriving at the mass of the product will be discussed in greater detail later. Computer 26 stores these results in an internal memory 28 or on a non-volatile storage media 34, such as a hard disk, floppy disk, or tape drive. The results may be later output to a display 32 or to computer-controlled cutters (not shown) to further process the food product. A user may control the weighing process by selectively activating control push buttons 36, which govern simple operations such as start, stop, and reset.

Figure 3:
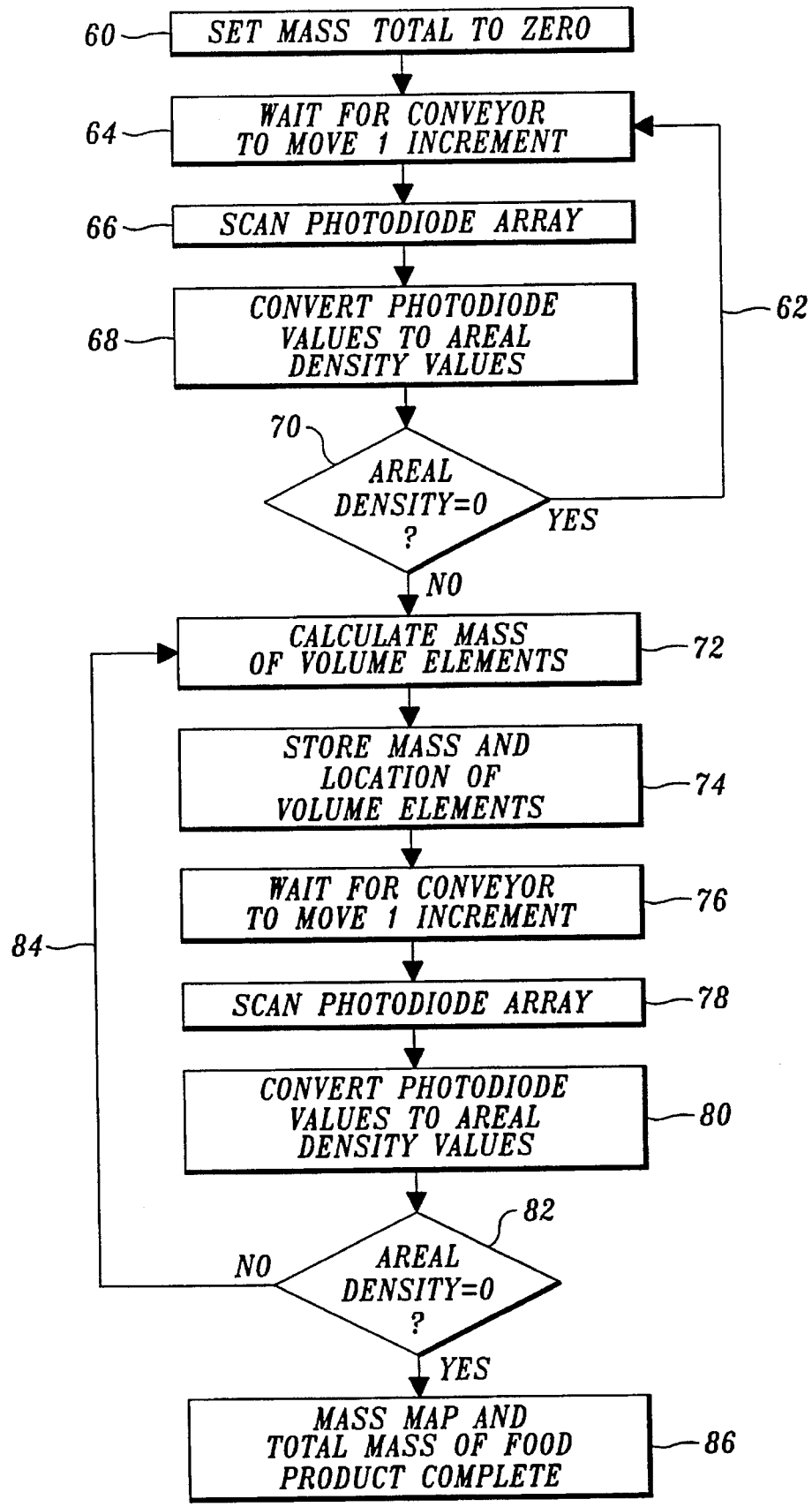
FIG. 3 is a flow chart of the computer program that processes the detector and sensor signals to determine the mass of each volume element and to generate a mass map.

FIG. 3 presents a flow chart of a computer program for practicing the weighing method of the present invention. At a block 60, the program initially clears any accumulated mass total to zero. The program then enters a loop 62 to wait until food product 4 is advanced by the conveyor to a position under the x-ray source. At a block 64, the program monitors the conveyor position to determine when it has moved one "conveyor increment." The distance traveled and speed of the conveyor is determined by decoding the signal generated by the position sensor. A conveyor increment is defined by the user and corresponds to the "thickness" of the incremental slice that the user wants to measure in the product. A smaller conveyor increment provides greater resolution in determining the weight of the product and greater accuracy. The larger the conveyor increment, the greater is the area of the product over which a single scan is averaged, and therefore, the lower the resolution and accuracy of the resulting mass/weight measurement.

X-ray detector array 14 should ideally measure the attenuation of x-rays in an equal thickness slice that extends from the detector to x-ray source 8. However, since x-rays 10 are emitted from the x-ray source in a cone shape, they will diverge with increasing distance from the source. As a result, the signal produced by x-ray detector array 14 represents the average density of a wedge-shaped slice of the food product that has a thin side facing the x-ray source and a thicker side facing the x-ray detector array. Although the wedge-shape of the slice introduces a slight error into the mass measurement, this error is minimized using two techniques. First, the x-ray source is placed sufficiently far away from the food product so that the x-rays that pass through the food product are almost vertical and in parallel alignment with each other. Second, the computer program is designed to process the signal produced by the x-ray detector array to take into account the effects of the geometric approximation. Both these techniques greatly decrease the parallax error.

After determining when the conveyor has moved a conveyor increment, the program scans photodiodes 38 in the x-ray detector array at a block 66. When the program scans these photodiodes, each photodiode returns an analog signal that corresponds to the intensity of light that each photodiode is receiving. The intensity of light received by the photodiode is representative of the total x-ray flux falling on an element of scintillating material adjacent to the photodiode. This signal is at a maximum when no material is present between the x-ray source and the element of scintillating material at the time the photodiode is scanned, and approaches zero when a large mass of material is present. Interface circuit 30 converts these analog signals into digital values that can be manipulated by the computer. At a block 68, the program then calculates the value of the average areal density of the material (mass per unit of surface area) based on the intensity of the light flashes impinging upon each photodiode. The digital value from each photodiode is divided by the surface area of the element of scintillating material adjacent to the photodiode to give a value representative of the average x-ray flux density over the element of scintillating material. The average flux density bears an inverse relationship to the average areal density of the material lying in the path between the x-ray source and the element of scintillating material. A suitable calibration procedure may be used to establish the exact relationship between average flux density and average areal density.

Figure 4:
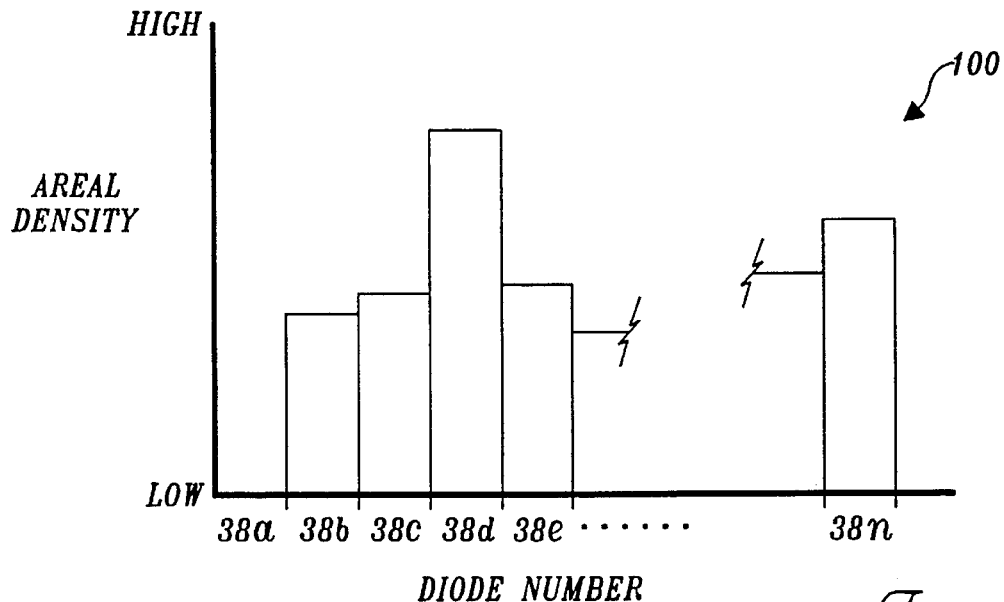
FIG. 4 is a representation of a detector scan as generated by the system.

FIG. 4 presents a graph 100 of a hypothetical scan of the photodiodes after the computer has converted the analog signals to average areal density values. The vertical axis of graph 100 represents the average areal density of the material that was scanned. A high density is measured when the photodiodes detect little light because the x-rays have been greatly attenuated as they pass through the food product. A low density is measured when the x-rays are less attenuated and the photodiodes of the detector generate a large electrical signal, since they receive a greater intensity of light. Along the horizontal axis of graph 100 is the photodiode number. The computer scans the photodiodes either sequentially or simultaneously to generate a profile for each incremental slice of the food product. In the hypothetical slice represented in FIG. 4, the signals from photodiodes 38*b*, 38*c*, and 38*e* indicate a generally low density of the food product, whereas the signal from photodiode 38*d* shows a high density, possibly indicating the presence of a bone or other foreign object in the path between the x-ray source and the detector.

Returning to FIG. 3, at a decision block 70, the program determines if a product has been advanced by the conveyor underneath the x-ray source. When no food product is underneath the x-ray source, the x-rays will not be attenuated and the signal from x-ray detector array 14 will be at its maximum. With appropriate calibration (to take into account any attenuation caused by the conveyor belt), the scanned values from the photodiodes indicate an average areal density of zero when no product is present, and the program takes loop 62 back to block 64 to wait another conveyor increment. If a product is present, the areal densities returned from the photodiodes are greater than zero, and the program execution continues at a block 72.

At block 72, the program computes the mass of each volume element for each scan. The mass of each volume element is found by multiplying: (1) the conveyor increment, (2) the cross-conveyor spacing between photodiodes, and (3) the average areal density determined from each photodiode. Multiplying the photodiode spacing by the conveyor increment provides the approximate surface area covered by each scan. Multiplying this area by the average areal density determined from the photodiode array signals gives a mass for the volume element extending above each photodiode of the x-ray detector array, through the food product.

Figure 5:
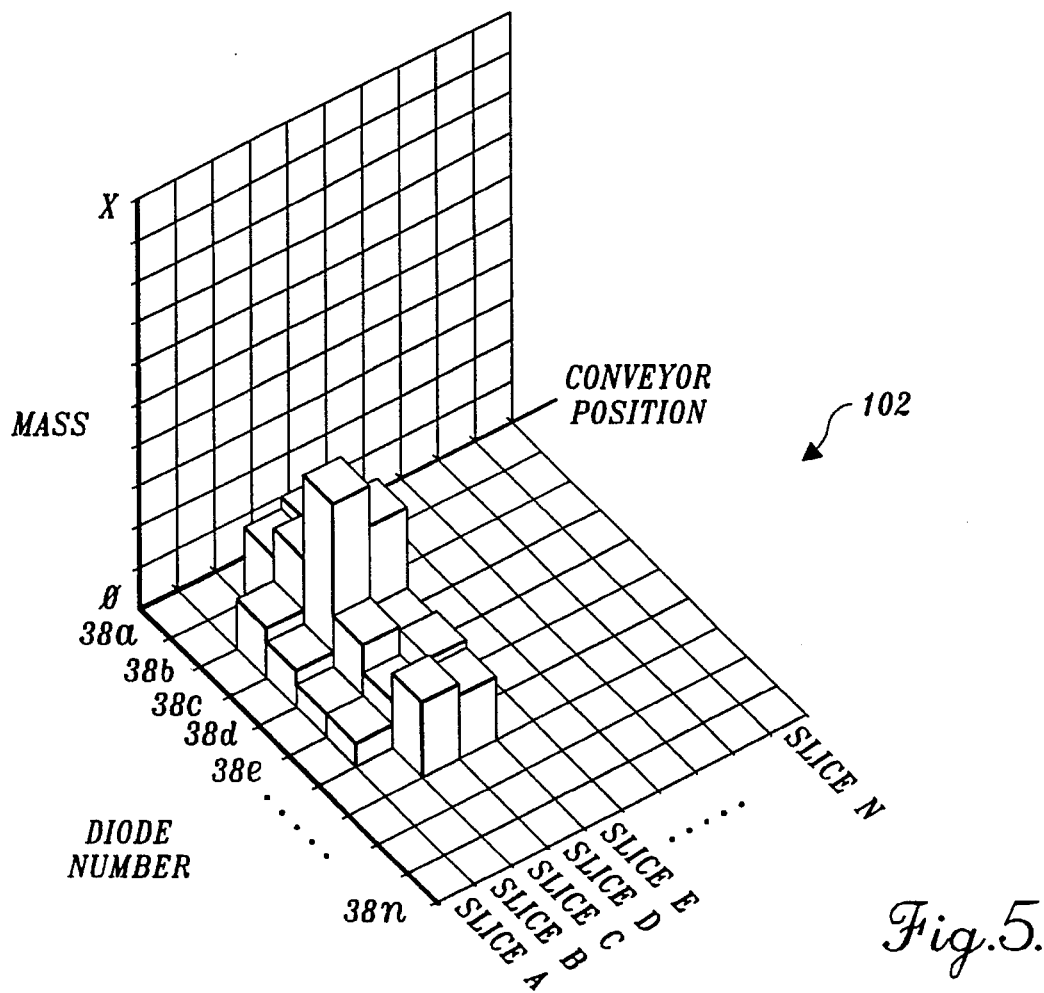
FIG. 5 is a representation of a hypothetical mass map as generated by the system; and, FIG. 6 is a cross-section diagram of an alternative preferred embodiment of the present invention.

At a block 74, the computer stores the mass and location of each volume element in memory to generate a mass map of the product. The mass of each volume element may be added to the previous sum to keep a running value of the total mass of the portion of the product that has been scanned. Alternatively, the total mass of the product may be calculated after the product is completely scanned. Referring to FIG. 5, a 3-dimensional representation of a hypothetical mass map 102 is presented. The x-axis of the map represents the mass of the food product at each volume element and the y-axis represents the photodiode number. The x- and y-axis correspond to graph 100 of FIG. 4, except that the average areal density value for each photodiode has been converted to an actual mass value of the food product for each volume element. For example, slice C of graph 102 corresponds to the profile of graph 100. In FIG. 5, however, a z-axis has also been added to represent the mass of the food product volume elements that are stored for successive incremental slices.

Returning to FIG. 3, at a block 76 the program monitors the conveyor movement to determine when it has advanced another conveyor increment. At blocks 78 and 80, the program then scans the photodiode array and converts the photodiode array signals into values representing the average areal density of each volume element in the slice. At a decision block 82, the program checks to see if the average areal density of the incremental slice is equal to zero. If the average areal density of the scan is zero, the food product to be weighed has completely passed x-ray detector array 14, and the program continues to a block 86. If the mass is not zero, the program follows a loop 84 back to block 72 to repeat the mass calculations for the next incremental slice.

At block 86, the final stage of the program's execution, the mass map of the product has been generated. It a running total of the mass of the product has been kept, then the total mass measurement is complete as well. If a running total has not been kept, then the program may sum the masses of all the volume elements to arrive at the total mass of the product. The total mass (or weight) may be presented to the user on display 32, or the mass may be used to label the packaging of the food product. (The weight may be determined by multiplying the mass by a value for the constant acceleration of gravity.) The mass map is stored in memory 28 or on nonvolatile storage media 34 so that it can be used later by food processing equipment to manipulate the food product. For example, food product 4 may be cut by computer-controlled water jets into pieces of different weights. Alternatively, the information contained in a mass map may be used to indicate when defects exist within a product. For example, the high-mass volume elements generated by photodiodes 38 in FIG. 5 indicate that a bone or other foreign object might be present at this point. If so, the bone could be removed by properly guiding cutting jets around the identified area. Regardless of how the information is subsequently used, however, the program immediately returns to block 60 to reinitialize and weigh the next food product on the conveyor belt.

An advantage of weighing system 2 is that it can easily be incorporated into new or existing food processing lines. Computer 26 may be remotely positioned relative to the measurement location, and x-ray source 8 and x-ray detector array 14 require only minimal space. As a result, the weighing system may be easily added to existing conveyor lines.

A further advantage of weighing system 2 is that mass can be very accurately measured for a variety of food products without having to recalibrate the system. Instead of measuring mass indirectly from the volume of a product, x-rays allow for direct measurement of the mass. Since x-rays are directly attenuated in proportion to the mass of the material through which they pass, any voids or variations within the product are taken into account by the x-ray weighing system. In addition, the density of the food product does not have to be reentered each time the system is used with a different product because the density is directly determined when the weighing system is applied.

Figure 6:
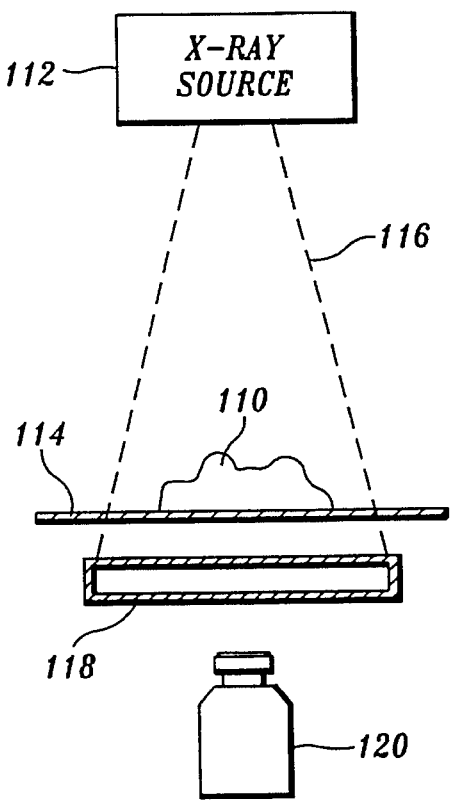

FIG. 6 illustrates a further preferred embodiment of the present invention wherein the food product or other item 110 is positioned and supported below an x-ray source 112 by a support surface 114 that is substantially transparent to the x-ray 116 generated by the x-ray source. The x-ray 116 pass through the food product 110, and the support surface 114 to impinge upon a fluoroscope screen 118 activated by the x-rays. The fluoroscope screen produces light flashes in proportion to the attenuation of the x-rays. The light flashes generated by the fluoroscope are recorded on a video camera 110 or other device capable of capturing the "picture" produced by the fluoroscope screen. The image received by the video camera can be analyzed and then processed by a computer system similar to that described above with respect to FIGS. 1 and 2. Video camera equipment is commercially available to convert the image received by the camera into digital values related to the intensity of light generated by the fluoroscope about the area of the fluoroscope. As such, a mass map of the object 110 can be generated and this information stored in memory and used later by food processing equipment to cut food product into desired pieces of different weights. Also, the information contained in the mass map can be used to indicate locations of defects within the product.

One advantage of the foregoing system is that a conveyor system and a position sensor of the types discussed above may not be required.

While the preferred embodiments of the invention have been illustrated and described, it will be appreciated that various changes can be made therein without departing from the spirit and scope of the invention. For example, it is readily appreciated that the computer is simply a convenience, and that the calculations used to derive the total mass of a food product could be derived using a hardwired logic circuit. Further, while an x-ray detector array 14 comprising scintillating material 12 and a line of photodiodes 38 provides an effective method for detecting x-rays, alternative photodiode layouts or detectors could be used. For example, the photodiodes may be positioned in several rows or in a square grid to increase the scanning area of the detector array. Alternatively, commercially available x-ray detectors could be substituted for the photodiodes and scintillating material to provide a higher resolution of the imaged food.

It is also recognized that while the current weighing system contemplates a conveyor running at a continuous speed, the motion of the conveyor could instead be placed under the control of weighing system 2. If the conveyor is controlled by the computer, it could be sped up or slowed down in response to the materials that were being scanned, the desired resolution of the mass map, and other external conditions. The conveyor could also be replaced with moving platforms to carry objects, or hooks that suspend objects above a processing area. In these alternative embodiments, the x-ray source and x-ray detector array could be horizontally disposed from each other, rather than vertically.

Those skilled in the art will appreciate that while the use of the weighing system was discussed with respect to weighing food products carried on a conveyor, that the weighing method could be applied to the weighing of moving objects in general. Any object that is permeable to x-rays could be weighed using the weighing method and system described above.

The embodiments of the invention in which an exclusive property or privilege is claimed are defined as follows:

1. A method of weighing an object transported on a conveyance means, the method comprising the steps of:
   (a) positioning an object to be weighed adjacent an x-ray source that generates x-rays;
   (b) exposing a portion of the object to the x-rays;
   (c) dividing the portion of the object exposed to x-rays into an array of volume elements;
   (d) detecting an intensity of the x-rays after they have passed through the object;
   (e) calculating a mass of each volume element of the object based on the intensity of the x-rays that have passed through the object; and
   (f) summing the mass of each volume element to determine a mass of the portion of the object exposed to x-rays.

2. The method of claim 1, wherein the portion of the object exposed to x-rays is the entire object, and the mass of the portion of the object exposed to x-rays is a total mass of the object, and thus, a total weight of the object.

3. The method of claim 2, wherein the step of calculating the mass of each volume element further comprises the step of storing the mass of each volume element and a location of each volume element to create a mass map of the entire object.

4. The method of claim 2, wherein the volume elements are oriented parallel to the direction that the x-rays pass through the object and extend from a surface of the object adjacent the x-ray source to an opposing surface of the object.

5. The method of claim 3, wherein the step of calculating the mass of each volume element of the object further comprises the steps of:
   (a) converting the intensity of the x-rays that have passed through the object to a value representing an average areal density of the volume element of the object through which the x-rays passed;
   (b) calculating an area of a cross-section of each volume element as measured perpendicular to the direction that the x-rays pass through the object to determine a surface element corresponding to each volume element; and
   (c) multiplying the value of the average areal density of each volume element by the surface element corresponding to each volume element to determine a mass of each volume element.

6. The method of claim 1, wherein the portion of the object exposed to x-rays is an incremental slice of the object having an incremental thickness.

7. The method of claim 6, further comprising the steps of:
   (a) storing the mass of each volume element of the incremental slice of the object;
   (b) advancing the object the incremental thickness past the x-ray source;
   (c) exposing an incremental slice of the object to the x-rays;
   (d) dividing the incremental slice of the object exposed to x-rays into an array of volume elements;
   (e) detecting an intensity of the x-rays after they have passed through the object;
   (f) calculating a mass of each volume element of the object based on the intensity of the x-rays that have passed through the object;
   (g) repeating steps (a) through (f) until the entire object has passed through the x-rays; and
   (h) summing the mass of each volume element to determine a total mass of the object, and thus, a weight of the object.

8. The method of claim 7, wherein the step of storing the mass of each volume element further comprises the step of storing a location of each volume element to create a mass map of the object.

9. The method of claim 7, wherein the volume elements are oriented parallel to the direction that the x-rays pass through the object and extend from a surface of the object adjacent the x-ray source to an opposing surface of the object.

10. The method of claim 8, wherein the step of calculating the mass of each volume element of the object further comprises the steps of:
    (a) converting the intensity of the x-rays that have passed through the object to a value representing an average areal density of the volume element of the object through which the x-rays passed;
    (b) calculating an area of a cross-section of each volume element as measured perpendicular to the direction that the x-rays pass through the object to determine a surface element corresponding to each volume element; and
    (c) multiplying the value of the average areal density of each volume element by the surface element corresponding to each volume element to determine a mass of each volume element.

11. A weighing system for weighing objects transported on a conveyance means, the weighing system comprising:
    (a) an x-ray source;
    (b) conveyance means for carrying an object to be weighed past the x-ray source;
    (c) a sensor for generating a sensor signal indicative of a position of the object;
    (d) a plurality of x-ray detectors positioned to receive x-rays emitted by the x-ray source that pass through the object to be weighed, each of the plurality of x-ray detectors generating a signal corresponding to an intensity of the x-rays impinging upon the x-ray detector; and
    (e) a processor comprising:
       (1) means for receiving the sensor signal and the signals generated by the plurality of x-ray detectors;
       (2) means for determining the portion of the object exposed to the x-rays from the received sensor signal;
       (3) means for partitioning the portion of the object exposed to the x-rays into a plurality of volume elements, each of the plurality of volume elements associated with one of the plurality of x-ray detectors; and (4) means for calculating the mass of each of the plurality of volume elements based on the associated signal from one of the plurality of x-ray detectors.

12. The weighing system of claim 11, wherein the means for calculating the mass of each of the plurality of volume elements comprises:

(a) means for converting each signal generated by one of the plurality of x-ray detectors to a value representing an areal mass density of the volume element associated with the one of the plurality of x-ray detectors; and (b) means for multiplying each value of the areal mass density by an area of a plane cut perpendicular to the direction of the x-ray through each one of the plurality of volume elements, to arrive at a mass for each one of the plurality of volume elements.

13. The weighing system of claim 12, the processor further comprising means for storing the mass and a location of each volume element to create a mass map of an object.

14. The weighing system of claim 12, the processor further comprising summing means for adding the mass of each volume element to obtain a total mass of the object, and thus, a weight of the object.

15. The weighing system of claim 11, wherein the conveyance means is a conveyor belt.

16. The weighing system of claim 15, wherein the sensor comprises a rotary encoder attached to a roller of the conveyor belt.

17. The weighing system of claim 15, wherein the conveyor belt is constructed of material permeable to x-rays.

18. The weighing system of claim 17, wherein the conveyor belt contains a spaced-apart pattern on a surface of the conveyor belt that is impervious to x-rays.

19. The weighing system of claim 18, wherein the sensor comprises means for detecting the spaced-apart pattern on the surface of the conveyor belt to determine the position of the object.

20. The weighing system of claim 11, wherein the plurality of x-ray detectors comprises:

(a) a layer of scintillating material positioned so that the x-rays from the x-ray source impinge on a surface of the layer of scintillating material and generate light in response to the x-rays; and (b) photodiodes disposed so that the light generated by the layer of scintillating material impinges on the photodiodes.

21. The weighing system of claim 20, wherein the photodiodes are arranged in a spaced-apart array along a line transverse to the direction of travel of the object being weighed.

22. The weighing system of claim 20, wherein the photodiodes are arranged in a spaced-apart grid under the object being weighed.

23. The weighing system of claim 11, further comprising controller means connected to the computer and the conveyance means, the controller means responding to the computer to control motion of the conveyance means.

24. The weighing system of claim 11, wherein the object comprises a food product.

25. A weighing system for weighing objects, comprising:

(a) an x-ray source;

(b) means for supporting an object adjacent the x-ray source in alignment with the path of the x-rays emitted from the x-ray source;

(c) a two-dimensional detector positioned to receive x-rays admitted by the x-ray source that pass through the object to be weighed, and generating signals corresponding to the intensity of the x-rays impinging on the detector about the area of the detector;

(d) recording means for recording the signals generated by the detector;

(e) a processor for processing the signal information recorded by the recording means to determine the mass of the object being weighed, the processor comprising:

(i) means for receiving the signals from the recording means;

(ii) means for determining an area of the object exposed to the x-rays and for dividing the area of the object exposed to x-rays into a plurality of volume elements;

(iii) calculating means for determining the mass of each of the plurality of volume elements from the signals; and (iv) summing means for summing the mass of each of the plurality of volume elements to determine the mass of the object being weighed.

26. The weighing system of claim 25, wherein the signals generated by the x-ray detector are composed of light waves.

27. The weighing system of claim 26, wherein the recording means comprises a camera.

28. The weighing system of claim 27, wherein the camera comprises a video camera.

29. The Weighing system of claim 28, wherein the detector generates a visual image of the object being weighed with a visually variable characteristic of the image of the object being weighed with a visually variable characteristic of the image related to the intensity of the x-rays received at various locations about the two-dimensional area of the detector.

30. The weighing system of claim 26, wherein the detector comprises a fluoroscope.

* * * * *

UNITED STATES PATENT AND TRADEMARK OFFICE
CERTIFICATE OF CORRECTION

PATENT NO. : 5,585,603  Page 1 of 2
DATED : December 17, 1996
INVENTOR(S) : A.W. Vogeley, Jr.

It is certified that error appears in the above-indentified patent and that said Letters Patent is hereby corrected as shown below:

| COLUMN | LINE | |
|---|---|---|
| [56] Pg. 1, col. 1 | Refs. Cited (Other Publs., Item 1) | After "Video-Imaging" insert --.-- |
| [56] Pg. 1, col. 1 | Refs. Cited (Other Publs., Item 1) | "Meat & Poultry," should read --MEAT & POULTRY,-- |
| 11 (Claim 12, | 16 line 10) | "x-ray" should read --x-rays-- |
| 12 (Claim 29, | 43 line 1) | "Weighing" should read --weighing-- |
| 12 (Claim 29, | 43 line 1) | "of claim 25" should read --of claim 27,-- |

UNITED STATES PATENT AND TRADEMARK OFFICE
CERTIFICATE OF CORRECTION

PATENT NO. : 5,585,603

DATED : December 17, 1996

INVENTOR(S) : A.W. Vogeley, Jr.

It is certified that error appears in the above-indentified patent and that said Letters Patent is hereby corrected as shown below:

| COLUMN | LINE | |
|---|---|---|
| 12 (Claim 29, | 45-47 lines 3-5) | Delete --of the object being weighed with a visually variable characteristic of the image-- |
| 12 (Claim 30, | 50 line 1) | "of claim 26," should read --of claim 29,-- |

Signed and Sealed this

Tenth Day of June, 1997

Attest:

BRUCE LEHMAN

Attesting Officer

Commissioner of Patents and Trademarks